MAGNETIC RECORD AND RECORD-CONTROLLED MECHANISM

Filed Sept. 6, 1951

INVENTOR.
FRANK G. DEDEK
BY Fidler, Crouse & Beardsley
ATTORNEYS 2,833,475

MAGNETIC RECORD AND RECORD-CONTROLLED MECHANISM

Frank G. Dedek, Detroit, Mich., assignor to Burroughs Corporation, Detroit, Mich., a corporation of Michigan Application September 6, 1951, Serial No. 245,356

4 Claims. (Cl. 235—61.12)

This invention relates to an improvement in records of the kind comprising discrete small masses of magnetic material in spaced arrangement on a non-magnetic support, and to improvements in apparatus for the utilization of such records. The present invention is particularly suited for use with records, such, for example, as accounting records, produced by employment of magnetic ink, such as disclosed in the copending applications of Theodore S. Bindshedler, Serial No. 576,475, filed April 5, 1956 (which is a continuation of an original application Ser. No. 237,241, filed July 17, 1951, and now abandoned) and Ernst W. Rickmeyer, Serial No. 237,155, filed July 17, 1951, upon substantially non-magnetic record materials, such as the usual paper forms, such record being produced for example, in typewriting machines, printing, calculating or accounting machines, or other recording machines or devices equipped with magnetic inking ribbons such as disclosed in the Bindshedler and Rickmeyer applications.

An object of the invention is to provide an improved form of magnetic record of the type comprising discrete small masses of magnetic material, such as magnetic ink, in spaced arrangement on a non-magnetic medium, such as an ordinary paper record form.

A further object of the invention is to provide an improved magnetic record capable of being reliably automatically read at higher speeds.

A further object of the invention is to provide an improved record of the above stated character and an apparatus for recovering and utilizing data from magnetic records with increased rapidity and reliability.

Other objects will be apparent upon reference to the following description taken in conjunction with the accompanying drawings, in which.

Figure 1:
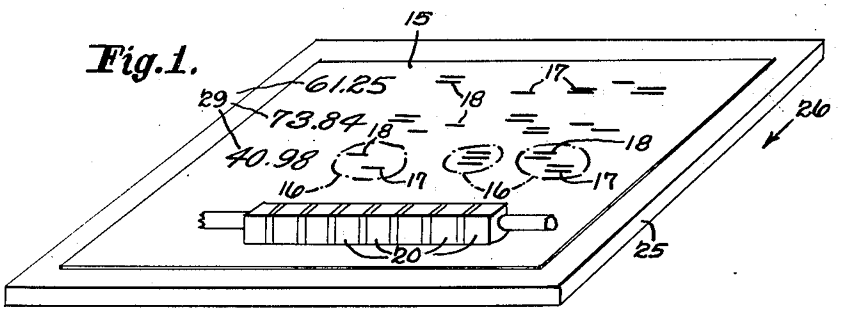
Fig. 1 shows a record in accordance with the present invention being fed past a reading means comprising a series of pairs of electromagnetic pick-up devices adapted to be operated by the record to produce electrical signals corresponding to the recorded data.
Figures 2, 3:
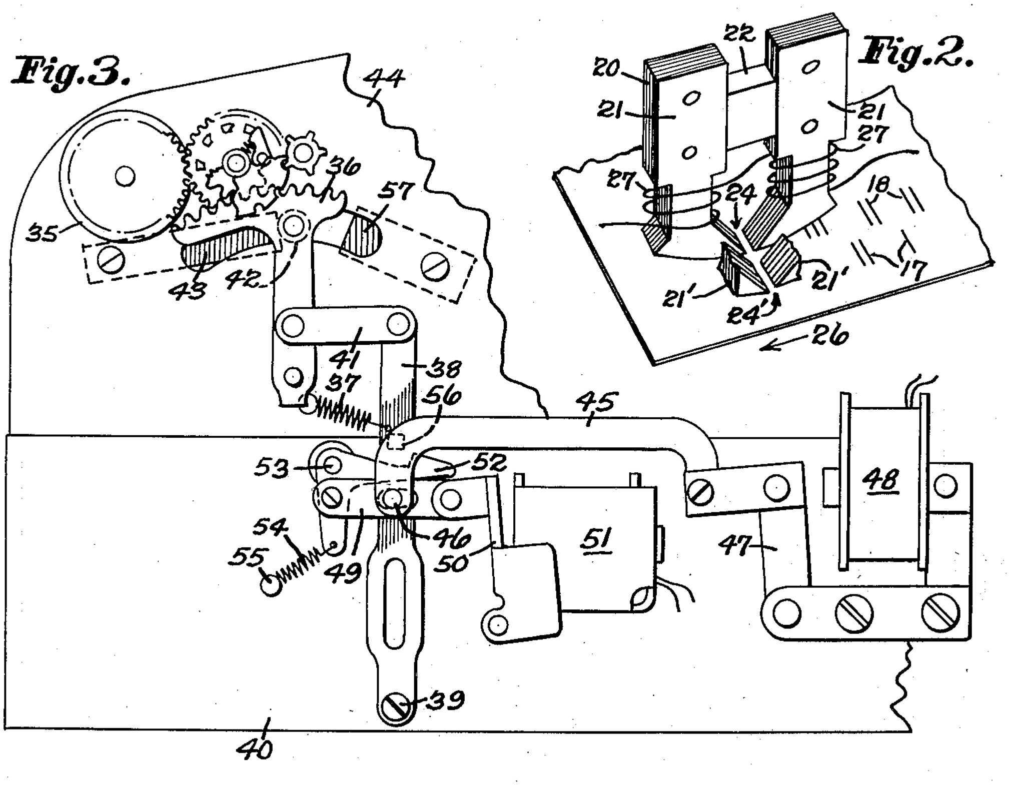
Fig. 2 is a somewhat schematic perspective view of portions of one of the electromagnetic pick-up devices forming the reading means, and a portion of a record being read.
Figure 4:
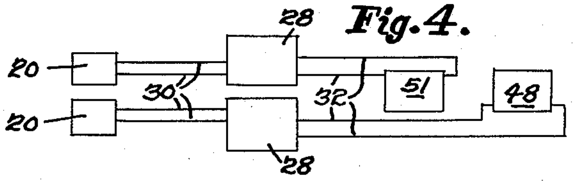

Fig. 3 is a vertical fore-and-aft section through a calculating apparatus having provisions in accordance with the invention to utilize, after amplification, the electrical signals produced by the reading means of Fig. 1, and to correspondingly operate a computing mechanism; and Fig. 4 is a schematic diagram showing the manner of electrically connecting a pair of pick-up devices through separate amplifiers to the respective ones of two electrically energizable operating devices of a means for operating or controlling a utilization device, such as that of Fig. 3.

The record as shown in Figs. 1 and 2 is in the form of a non-magnetic paper card 15 or the like having thereon magnetic data representations 16 which are formed of small spaced masses of paramagnetic material of high permeability, such masses being in the form of short narrow lines 17 and 18 which may be produced by printing with a magnetic ink or magnetic inking ribbon as disclosed in the above-mentioned Bindshedler and Rickmeyer applications. Inks and ribbons of the kind disclosed in the Rickmeyer application are preferred.

As disclosed in the Bindshedler application, such records may be sensed or read automatically by means of an electromagnetic pick-up device 20 of the kind shown in Fig. 2 and comprising a core having legs 21 formed of stacked laminations of transformer steel. When the data-representations of the records to be read are formed of magnetically "soft" material, i. e. paramagnetic material of low coercivity and remenance, as when they are printed with the inks or inking ribbons of the above-mentioned Rickmeyer application, the yoke member 22 is constituted by a permanent magnet insert formed of a magnetic material of high coercivity such as an "Alnico" (registered trademark). The cylindrically convex record confronting faces of the pole ends of the legs 21 are separated by a narrow air gap 24 having dimensions of the order of dimensions of the short, narrow line elements 17 and 18 of the data-representations on the record.

Fig. 1 also shows schematically a portion of a movable record supporting and feeding member 25 of any suitable form such as a traveling belt or reciprocating plate, of a suitable record feeding mechanism of any desired construction, capable of feeding record cards or sheets 15 successively, each in the direction of the arrow 26, past a series of pairs of stationary pick-up devices 20. As the record 15 and the pick-up device 20 are moved relatively to each other transversely to the line elements of the data-representations and in such manner that the line elements of the data-representations are parallel to the gap of the pick-up device so that each line element 17 or 18 passes through the position where it bridges or substantially bridges the gap, the reluctance of the magnetic circuit of the pick-up device 20 is momentarily reduced and then restored to normal. The magnetic flux threading the core varies inversely to the reluctance so that, as each line element 17 or 18 of a data-representation passes the gap of the pick-up device, a cycle of alternating electric potential is induced in the output windings 27 on the legs 21 of the core. The output windings 27 of each such pick-up device 20 may be connected to an amplifier 28 (Fig. 4) of a known kind which, for each cycle of alternating input potential, produces a single pulse of direct current output sufficient to energize means to operate a desired utilization device. The rate at which the magnetic line elements 17, 18 of the data-representations pass the sensing gap of the pick-up device must, of course, be kept at or below the maximum reliable operation frequency of the utilization means.

In the example of magnetic record disclosed in the Bindshedler application, numerical data-representations consist of a single group of parallel line elements for each digit, the number of line elements in the group being equal to the value of the digit, i. e. "2" is represented by a pair of lines, "3" by a group of three lines and "9" by a group of nine lines. The rate at which such digital data-representations are read by the pick-up device must be kept low enough to permit the utilization device, such as a counter or totalizer, to operate reliably nine times while each data-representation passes the gap of the pick-up device.

The present invention provides an improved form of magnetic data-representation which permits of increased rapidity of automatic reading of the records and to an improved form of electro-magnetically operated actuating means for a utilization means, such as a counter or totalizer, adapted for use with records having such data-representations.

A record in accordance with the invention, as shown in Fig. 1, comprises a sheet or card 15 of substantially non-magnetic material, such as paper, usually used for printed, typed or written records. The data-representations 16, comprise short parallel line elements 17 and 18 of para-magnetic material of high permeability, formed preferably of deposits of magnetic ink as disclosed in the Bindshedler or Rickmeyer application. As shown in Fig. 1, the representations 16, instead of being formed, each of a single group of line elements, are formed instead of various combinations of line elements selected from or arranged in a plurality (two in the illustrated example) of spatially relatively displaced groups of line elements 17 and 18, the line elements 17 and 18 of the different groups having different elemental significances or values, such as unit value and multi-unit value respectively. In the magnetic record representations 16 for the digits from "1" to "9," in the illustrated example, each of the line elements 17 in the one group position have the value of "1" and each of the line elements 18 in the other group position have the value of "3." When desired, the record may also have duplicate data printed, typed or written thereon in the usual visual record characters as shown at 29 in Fig. 1, where amounts are represented in the usual Arabic numerals in a column at the left and the magnetic record representations 16 in accordance with the present invention are at the right. From a comparison of the two forms of record representations 16 and 29 shown in Fig. 1, it will be seen that the magnetic record representation 16 for each numeral is formed of the number of 3-value line elements 18 together with the number of 1-value line elements 17 having a total value equal to the digit represented. Thus, the magnetic representation 16 for "2" is composed of two line elements 17 in the 1-value position, the magnetic representation for "7" is composed of two line elements 18 in the 3-value position and one line element 17 in the 1-value position, and the representation 16 for the digit "9" is composed of three line elements 18 in the 3-value position.

The line elements 17 and 18 of the data-representations 16 are arranged with their lengths transversely the line of relative movement, indicated by the arrow 26, between the record and the pick-up device in the reading operation and the line elements 17 or 18 of each group having more than one line element are spaced along such line of movement in parallel relation to each other so that they will successively pass the gap 24 in the pick-up device 20 in the course of such relative movement. It is preferred to sense or read the single value line elements 17 and the multiple value line elements 18 by the respective ones of a pair of pick-up devices 20 which may have their gaps 24' and 24 in alignment as indicated in Fig. 2 by the pole tip portions 21' of a second pick-up device. The multiple-value line elements 18 are, therefore, spaced lengthwise from the unit value line elements 17 and the former are so positioned relative to the latter in the direction of relative movement between the pick-up devices 20 and record 15 that all of the line elements of one value in a representation 16 will pass the gap of the one pick-up device before the line elements of the other value in the same representation reach the gap of the other pick-up device i. e. so that line elements will not be sensed or read simultaneously by the two pick-up devices 20 of a pair. It will be apparent that the line elements 17 and 18 of different value in a representation 16 can be arranged in endwise alignment if the gaps 24, 24' of the pair of pick-up devices 20 are spaced in the direction of movement of the record relative to them to such an extent that all the line elements of one value will pass one gap before the line elements of the other value reach the other gap. The outputs of the pair of pick-up devices 20 are led by conductors 30 (Fig. 4) to the respective ones of two amplifiers 31, the outputs of which are separately conducted by conductors 32 to a utilization device, such as the one hereinafter described, adapted to receive two separate inputs and to respond appropriately to each.

In the illustrated embodiment of the invention, the utilization device comprises a counter or register provided with an electro-magnetic actuating means, which when it receives an input pulse caused by a 1-value line element 17 of a number-representation being read, advances a numeral wheel of the counter one step to add "1" thereon, and, when it receives an input impulse caused by a 3-value line element 18 of the number-representation being read, advances said numeral wheel to the extent required to add "3" thereon. The counter or register may be of a known kind, such as the register shown in United States Patent No. 1,326,504 to A. A. Horton, or one of the improved forms thereof such as included in the well known Burroughs "Class 5 Calculators" of later years. Fig. 3 shows the numeral wheel 35 and essential portions of the actuator mechanism therefor, including the actuator sector 36, for a single numerical order of the register. In the Burroughs calculators and as shown in the above mentioned Horton patent, the actuator sector is normally spring held in its rearmost position, is moved forwardly without advancing the numeral wheel when a key of the corresponding bank of digit keys is depressed, and advances the numeral wheel as it is subsequently returned to normal by its spring.

In the arrangement shown in Fig. 3, however, the actuator sector 36 is urged forwardly by a tension spring 37 connected to a lever 38 pivoted at its lower end on a stud 39 secured in a frame partition plate 40 and pivotally connected at its upper end to one end of a link 41 which is pivotally connected at its other end to the actuator 36. The spring 37 normally holds a stud 42 which is secured in the sector 36 against a limit stop 43 secured to the register frame partition plate 44. A link 45 is pivoted at one end on a stud 46 secured in an intermediate portion of the lever 38 and at its other end is pivotally connected with the movable armature 47 of an electro-magnet 48. The stud 46 passes through a short slot in a link 49 pivotally connected at one end to the movable armature 50 of another electro-magnet 51 and at its other end to a latch hook 52 pivoted on a stud 53 secured in the partition plate 40. A tension spring 54 connected between an arm of the latch hook 52 and a stud 55 secured in the partition plate 40 normally holds the armature 50 in retracted position and the latch hook 52 disengaged from a squared stud 56 secured in the lever 38.

When the electro-magnet 51 is energized, its armature 50 pulls the link 49 rightwardly in Fig. 3 and the initial portion of such movement of the link 49 rocks the latch hook 52 into the path of the stud 56. After a slight initial portion of its rightward movement, the link 49 acts on the stud 46 to rock the lever 38 and pull the actuator sector 36 clockwise in Fig. 3 against the tension of the spring 37. The latch hook 52 arrests the stud 56 and lever 38 when the sector 36 has rocked one-tooth space. Such movement of the actuator sector 36 advances the register wheel 35 by one unit, i. e., adds "1" on the wheel. When the electro-magnet 51 de-energizes, the springs 55 and 37 return the sector 36, lever 38, latch hook 52, link 49 and armature 50 to normal position. The return movement of the sector 36 is idle and does not affect the counter wheel 35.

When the electro-magnet 48 is energized, its armature 47 pulls the link 45 rightwardly in Fig. 3 and rocks the lever 38 and sector 36 clockwise, thus advancing the counter wheel 35. Because of the length and position of the slot in the link 49, the latter is not moved and the latch hook 52 remains in its normal ineffective position, but the movement of the sector 36 and advance of the register wheel 35 are limited by engagement of the stud 42 against a limit stop 57 secured to the partition plate 44. The movement of the sector 36 by the electro-magnet 48 is sufficient to advance the register wheel 35 three units, i. e., to add "3" thereon. When the electro-magnet 48 de-energizes, the spring 37 returns the sector 36, lever 38, link 45 and armature 47 to normal.

Athough Fig. 3 shows only the actuating means for a single numerical order of the register, it will readily be understood that the illustrated structure may be duplicated for as many orders of the register as desired. For each such order, a pair of pick-up devices 20 may be provided, all being assembled in a unitary structure as shown in Fig. 1. As shown in Fig. 4, the winding of the electro-magnet 51 for each order is connected to the output terminals of the amplifier 28 receiving its input from that one of the pick-up devices 20 of the pair for the corresponding order which reads the 1-value line elements 17, and the winding of the electro-magnet 48 is connected to the output terminals of the amplifier 28 which receives its input from that pick-up device 20 of the same pair which reads the 3-value line elements 18. With that arrangement, the magnetic record representations 16 of all numerical orders of an amount are read and the respective digit values are entered in all of the corresponding orders of the register simultaneously.

It will readily be understood that by placing the line elements 17 and 18 with their lengths vertical and with the unit value line elements 17 displaced vertically from the multiple value line elements 18 and by employing a relative scanning movement between the record and pick-up means transverse to the lengths of the line elements, i. e., crosswise of the record, the magnetic representations for all orders of a multiple order amount may be read in succession by means of a single pair of pick-up devices 20. By providing each of the pick-up devices 20 of the pair with a commutating means, such as the one disclosed in the Bindshedler application, the outputs of the amplifiers 28 for the two pick-up devices may be distributed to the respective electro-magnets 48 and 51 for the corresponding orders of the register actuating means. Other modifications within the scope of the invention will be apparent to those skilled in the art.

I claim:

1. A data record comprising a record web having on a face thereof data-bit-representations each within an individual, small, data-bit-representation area comprising two smaller portions on opposite sides of a straight line of division, each of said data-bit-representations being one of a series of different combinations of discrete, spaced, representation elements, said combinations each consisting of at most a small plurality of discrete representation elements in one of said area portions and at most a small plurality of discrete representation elements in the other of said area portions, and each element consisting of a mark in the form of a discrete, short line extending substantially across said area portion in a direction transverse to said line of division.

2. A data record comprising a record web having on a face thereof a plurality of data-bit-representations spaced along at least one strip of said face and each placed within an individual, small, data-bit-representation area comprising two smaller portions on opposite sides of a straight line of division extending transversely of said strip, each of said data-bit-representations being one of a series of different combinations of discrete, spaced, representation elements, said combinations each consisting of at most a small plurality of discrete representation elements in one of said area portions and at most a small plurality of discrete representation elements in the other of said area portions, and each element consisting of a mark in the form of a discrete, short line extending substantially across said area portion in a direction transverse to said line of division.

3. A data record comprising a record web having on a face thereof a plurality of data-bit-representations spaced along at least one strip of said face and each placed within an individual, small, data-bit-representation area comprising two smaller portions on opposite sides of a straight line of division extending lengthwise of said strip, each of said data-bit-representations being one of a series of different combinations of representation elements, said combinations each consisting of at most a small plurality of representation elements in one of said area portions and at most a small plurality of representation elements in the other of said area portions, and each element consisting of a mark in the form of a short line extending substantially across said area portion in a direction transverse to said line of division.

4. A data record comprising a record web having on a face thereof data-bit-representations each within an individual, small, data-bit-representation area comprising two smaller portions on opposite sides of a straight line of division, the two portions of each such area being also relatively displaced longitudinally of said line of division, each of said data-bit-representations being one of a series of different combinations of representation elements, said combinations each consisting of at most a small plurality of representation elements in one of said area portions and at most a small plurality of representation elements in the other of said area portions, and each element consisting of a mark in the form of a short line extending substantially across said area portion in a direction transverse to said line of division.

References Cited in the file of this patent

UNITED STATES PATENTS

| | | |
|---|---|---|
| Re. 23,385 | Knutsen | July 3, 1951 |
| 1,514,503 | Bull | Nov. 4, 1924 |
| 2,026,329 | Tauschek | Dec. 31, 1935 |
| 2,209,106 | Brand | July 23, 1940 |
| 2,302,002 | Bryce | Nov. 17, 1942 |
| 2,308,927 | Maul | Jan. 19, 1943 |
| 2,337,553 | Hofgaard | Dec. 28, 1943 |
| 2,346,250 | Bryce | Apr. 11, 1944 |
| 2,427,383 | Bryce | Sept. 16, 1947 |
| 2,436,829 | Roth | Mar. 2, 1948 |
| 2,547,838 | Russell | Apr. 3, 1951 |
| 2,584,318 | Allyn | Feb. 5, 1952 |
| 2,600,817 | Victoreen | June 17, 1952 |
| 2,692,083 | Marsh | Oct. 19, 1954 |